United States Patent

[11] 3,574,371

| [72] | Inventors | Georg Kindel;<br>Hans Dubielzig, Lemforde, Hannover, Germany |
|---|---|---|
| [21] | Appl. No. | 855,301 |
| [22] | Filed | Sept. 4, 1969 |
| [45] | Patented | Apr. 13, 1971 |
| [73] | Assignee | Firma Lemforder Metallwaren AG<br>Lemforde, Hannover, Germany |
| [32] | Priority | Nov. 7, 1968 |
| [33] | | Germany |
| [31] | | P 18 07 465.2 |

[54] BALL JOINT SUPPORT FOR THE WHEEL SUSPENSION OF MOTOR VEHICLES
12 Claims, 1 Drawing Fig.

[52] U.S. Cl. .................................................. 287/90
[51] Int. Cl. .................................................. F16c 11/06
[50] Field of Search .......................................... 287/90 (A), 90 (C), 87

[56] References Cited
UNITED STATES PATENTS

| 2,913,268 | 11/1959 | Booth .......................... | 287/90C |
| 3,019,041 | 11/1962 | Scheublein, Jr., et al.... | 287/87 |
| 3,104,117 | 9/1963 | Pierce .......................... | 287/87X |

*Primary Examiner*—David J. Williamowsky
*Assistant Examiner*—Andrew V. Kundrat
*Attorney*—Mc Glew and Toren ABSTRACT: A ball joint support for the wheel suspension of motor vehicles includes an outer housing portion having a central cylindrical extension forming a seat for a bearing liner and a ball head of a joint pin, and an inner housing portion forming a central cover for the cylindrical extension. Each housing portion includes an upper cylindrical extension forming a double walled housing with a flange portion which is adapted to be secured to the pad of a wheel carrier of a vehicle. The two extensions are joined together such as by indentations and by the bolt securing them to the wheel carrier pad. The upper extensions are widened out in the manner of a truncated cone and then form cylindrical portions with flanges at their outer peripheries which are bolted to the pad.

PATENTED APR 13 1971
3,574,371
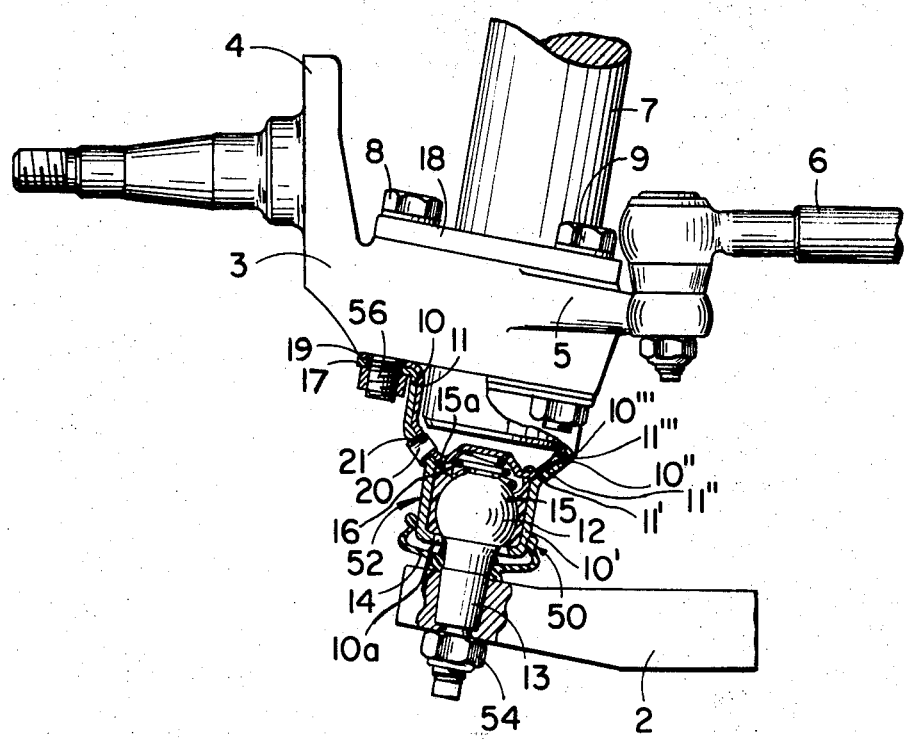
INVENTORS
George Kindel
Hans Dubielzig
by *McGlew & Toren*
ATTORNEYS.

3,574,371

BALL JOINT SUPPORT FOR THE WHEEL SUSPENSION OF MOTOR VEHICLES

SUMMARY OF THE INVENTION

This invention relates in general to a construction of universal joints and in particular, to a new and useful ball joint for the individual wheel guidance of motor vehicles and which includes a housing portion with an upper mounting extension of double walled construction, the inner one of the walls forming the cover for the housing carrying the ball joint.

It is known to employ ball joints for the individual suspension of wheels of motor vehicles and to provide means for the connection of the wheel carrier to the wheel guidance elements which form upon the wheel axle, for instance, a shock absorber. The invention is an improvement over such joint constructions in respect to the simplicity and durability of construction and its compact utilization of space and inasmuch as it provides a joint which is capable of withstanding large stresses. In accordance with the invention, the ball joint includes a housing which is formed by two generally cylindrical pot-shaped metal nested parts. An outer metal part includes a cylindrical extension forming the housing for the ball head of the joint pin. An inner cylindrical part which is arranged in juxtaposition to the outer cylindrical part includes a central portion forming a cover for the cylindrical extension of the outer metal part. Each part is widened outwardly from the cylindrical extension of the outer part and forms an intermediate frustoconical portion and a cylindrical outer portion with a surrounding flange which is bolted to the pad of the wheel carrier. The doubled wall construction for the mounting of the cylindrical extension part which contains the joint pin provides a strong means for attaching the joint to the housing of the wheel carrier. The construction is such that the inner metal part forms a cover for the cylindrical extension of the outer metal part and it is adapted to bear against the bearing liner surrounding the ball head of the joint pin. The two metal parts are joined together before fitting to the wheel carrier by forming a plurality of indentations or depressions which facilitate interengagement of the two walls of the housing. The juxtaposed walls are advantageously provided with a bore therethrough with a surrounding sealing sleeve extending through the entire length of the bore and providing a means at the lower end of the housing for draining any moisture therefrom. For this purpose the bore and the sealing sleeve is provided at the lower end of a widened truncated cone portion of the housing, at the outer end of the cylindrical extension forming the housing for the joint pin ball head.

The invention construction provides a housing which is made of a few parts which may be manufactured by a draw press method and which may be easily assembled to the wheel carrier. The construction provides a doubled walled housing of great strength although only relatively light sheet metal wall portions need be used. Machining of the outside surfaces of the housing is not necessary and therefore such a joint can be produced at relatively low manufacturing cost.

Accordingly, it is an object of the invention to provide a ball joint assembly which includes a ball joint housing having a double walled outer mounting wall and shock absorber receiver.

A further object of the invention is to provide a ball joint which is simple in design, rugged in construction, and economical to manufacture. The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

In the drawing:

The only FIGURE of the drawing is a partly elevational and partly sectional view of a wheel suspension for a motor vehicle having a joint housing constructed in accordance with the invention.

GENERAL DESCRIPTION OF THE PREFERRED EMBODIMENT

Referring to the drawing in particular, the invention embodied therein comprises a universal or ball joint assembly generally designated 50 which is adapted to be positioned on a pad 3 of a wheel carrier 4. The ball joint assembly 50 includes a hinge pin 13 having a ball head 12 which is universally pivotal within a housing generally designated 52. The pin portion 13 is connected to a wheel guidance member 2 and is retained in such connection by a suitable bolt element 54. A steering knuckle arm 5 is rigidly connected to the pad 3 and is joined to a connecting rod 6. The pad 3 receives the lower end of a tubular housing 7 of a shock absorber strut, which extends through the pad 3, and is provided with a collar 18 which is clamped to the upper surface of the pad 3 by means of screws or bolts 8 and 9. The upper end of the shock absorber housing 7 (not shown) is braced in the usual manner against a wall part of the chassis or the vehicle frame in an articulated and reserted manner.

In accordance with the invention, the ball joint housing 52 comprises an outer sheet metal part 10 and an inner sheet metal part 11. The outer part 10 includes a generally central cylindrical extension 10' which forms the receiving housing for the ball head 12 of the joint pin 13. The cylindrical extension 10' includes an opening 10a at its outer end through which the pin 13 extends and which is sealed by an elastic sleeve 14. The spherical head 12 rests in a bearing seat 15 made of an elastic material which has an upper edge or annular lip 15a which is in contact with a bottom portion 11' of the metal part 11 which also forms a cover for the housing for the ball head 12. The bottom portion 11' forms a central raised portion or receptacle forming a spherical dome of the cover which accommodates a pressure spring 16 for the automatic adjustment of the joint parts.

Each of the metal parts 10 and 11 includes frustoconical intermediate extending portions 10" and 11" which lead at their outer ends to cylindrical outer parts or portions 10''' and 11'''. The cylindrical outer parts 10''' and 11''' carry mounting flanges 17 and 19 respectively having openings for clamping bolts 56 which hold them in position to the pad 3.

Before assembly to the pad 3, the housing parts 10 and 11 are held together in an oriented position by providing a plurality of depressions or indentations through the wall portions forming each part to lock the two parts in an oriented juxtaposition. After this is done the whole joint housing can be stored and handled until its final attachment with the pad 3 of the wheel carrier 4.

The frustoconical portions 10" and 11" are provided with aligned through bores 20 and a sealing sleeve 21 is positioned to extend the full length of the bore to ensure that no moisture will collect between the housing parts and to permit passage of any moisture from the interior of the housing parts outwardly through the interior of the sleeve 21.

The joint assembly of the invention can be used for spending any wheel of a vehicle including a front wheel which may be employed for steering as well as a rear wheel.

I claim:

1. A ball joint assembly comprising a housing including an outer wall part having a generally centrally arranged tubular extension forming a ball head housing with an opening at its outer end for the passage of a ball pin, said housing having at its other end an inner wall, said inner wall and said outer wall each including a widened tubular portion axially aligned with said tubular extension and terminating at its end farthest from the ball head housing in an exterior substantially radial flange which is adapted to be secured to a wheel carrier pad, said inner and outer walls being held in juxtaposition.

2. A ball joint assembly, according to claim 1, wherein said inner and outer walls are substantially cup-shaped said inner wall overlying said outer wall and extending over the cylindrical extension of said outer wall, said inner and outer housing portions being connected together.

3. A ball joint assembly, according to claim 1, wherein said inner and outer walls comprised drawn sheet metal parts having a fastening flange surrounding its upper end.

4. A ball joint assembly, according to claim 1, wherein said inner and outer parts each include a truncated conical intermediate portion adjacent to and extending outwardly from the tubular extension of said outer wall part.

5. A ball joint assembly, according to claim 1, wherein said inner wall forms a cover for the extension of said outer portion, a joint pin having a ball head retained within said housing and resilient means bearing between said cover and said ball head of said joint pin.

6. A ball joint assembly, according to claim 5, wherein said inner wall portion forming the cover of said extension has a raised central portion, said resilient means comprising a spring disposed in said raised central portion and bearing against the ball head of said joint pin.

7. A ball joint assembly, according to claim 1, wherein said inner housing and said outer housing have indentations forming connecting means between said inner and outer portions orienting said portions in juxtaposition.

8. A ball joint assembly, according to claim 1, wherein said inner and outer walls include a frustoconical intermediate portion adjacent said tubular extension of said outer portion, a bore extending through said frustoconical portion for the passage of any moisture from the interior of said housing therethrough.

9. A ball joint assembly, according to claim 8, including a sleeve covering the bore through said intermediate frustoconical portion for sealing the space between said inner and outer walls of said housing.

10. A ball joint assembly adapted to be connected to the pad of a wheel carrier comprising a housing with a juxtaposed inner and outer wall of generally cup-shaped configuration, said outer wall including a generally central cylindrical extension, said inner wall having a bottom forming a cover for said cylindrical extension at one end, the opposite end of said cylindrical extension having an opening for a hinge pin, a hinge pin having a ball head within said cylindrical extension and a pin portion extending through the opening of said cylindrical extension, resilient means in said housing bearing against said ball head for permitting articulated pivoted movement of said ball head, said inner and outer walls forming a widened tubular shock absorber receiving housing above the inner wall portion forming the cover of said ball housing, and means at the outer end of said shock absorber receiving housing farthest from said cylindrical extension for securing said housing to the pad of the wheel carrier.

11. A ball joint assembly, according to claim 10, wherein said means for securing said housing to a pad of a wheel carrier comprises an annular flange having openings for receiving bolts therethrough for securing the annular flange to the pad of the wheel carrier.

12. A ball joint assembly, according to claim 10, wherein said resilient means comprises a liner within said tubular extension of resilient material, and a spring disposed between said ball head and the bottom formed by said inner wall.